Sept. 25, 1951 S. D. POOL ET AL 2,569,194
APPARATUS FOR PLANT CULTIVATION

Filed Dec. 23, 1948 3 Sheets-Sheet 1

Inventors
Stuart D. Pool
Bernise J. Shafer
Paul O. Pippel Atty.

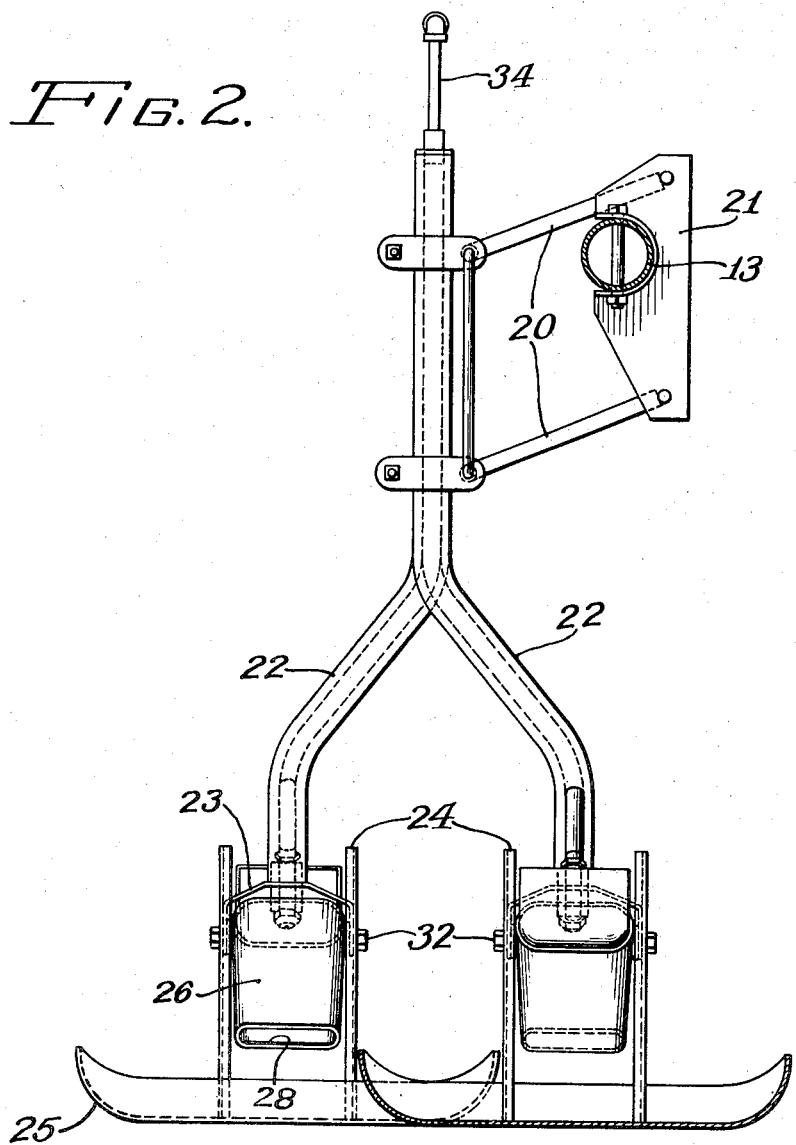

Sept. 25, 1951  S. D. POOL ET AL  2,569,194
APPARATUS FOR PLANT CULTIVATION
Filed Dec. 23, 1948  3 Sheets-Sheet 3
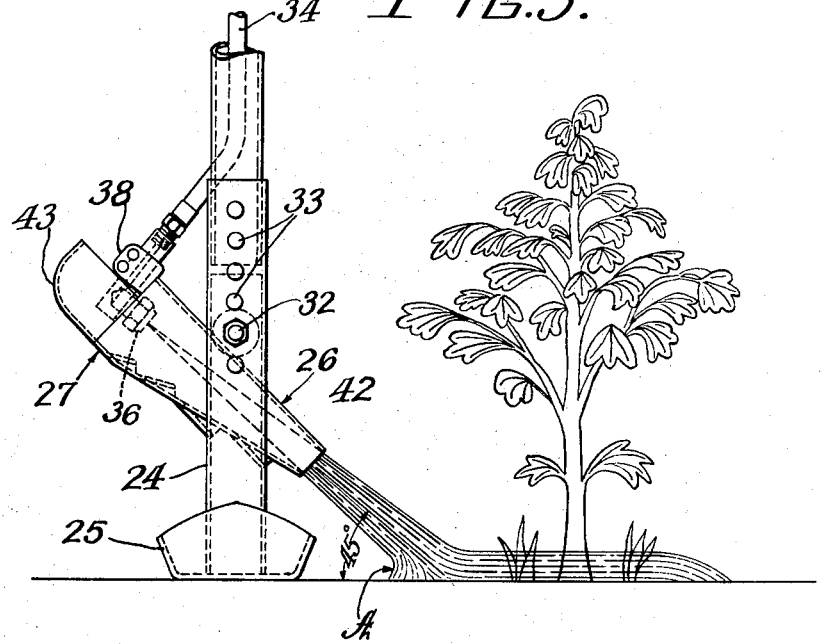
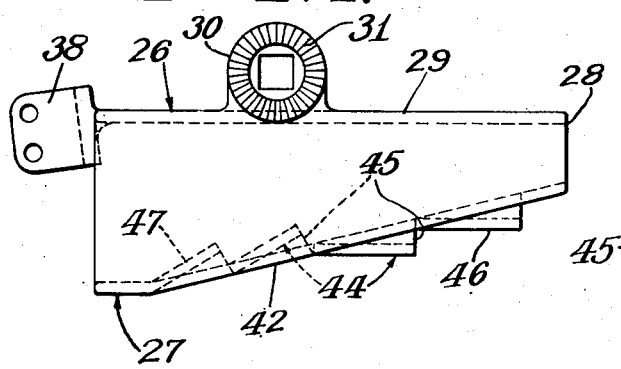
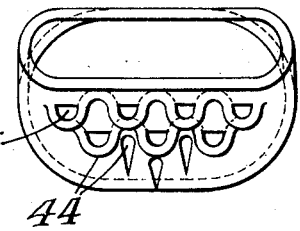
Inventors
Stuart D. Pool
Bernise J. Shager
Paul O. Pippel Atty.

Patented Sept. 25, 1951

2,569,194

UNITED STATES PATENT OFFICE 2,569,194

APPARATUS FOR PLANT CULTIVATION

Stuart D. Pool and Bernise J. Shager, Moline, Ill., assignors to International Harvester Company, a corporation of New Jersey Application December 23, 1948, Serial No. 66,908

8 Claims. (Cl. 126—271.2)

This invention relates to agricultural implements and particularly to apparatus for plant cultivation. More specifically, the invention concerns improved mechanism for destroying weeds and the like which tend to interfere with and retard the growth of selected vegetation.

The principal object of the invention is to provide improved mechanism for the destruction of weeds and the like by high temperature heat.

Another object of the invention is to provide improved power driven machinery for the destruction by flame of weeds and like undesirable vegetation in the vicinity of growing crop plants substantially without injury to the cultivated plants.

The method of cultivation and the apparatus therefor described herein are more readily adaptable to the cultivation of plants which tend to develop a strong stem which is more resistant to the application of heat than weeds and grasses growing in the crop row. Apparatus which has previously been proposed for the flame cultivation of plants has been inefficient and failed to take into consideration certain factors of great importance to the successful flame cultivation of crops.

For example, with previous apparatus the result achieved has been a flame having a core consisting of air and unburned gases. The cross-section of the flame and the angle at which it has been directed toward the ground has been such that the flame has not clung to the surface of the ground but has risen into the plant foliage and caused damage thereto.

Another object of the invention is therefore to provide a coreless flame and a burner for directing a broad flat flame upon the ground in such a manner as to cause the flame to cling to the surface and to flow across the plant row.

A further object of the invention is to provide an improved burner head having incorporated therein means to prevent extinguishment of the flame upon closure of the burner outlet.

Other objects and advantages of the invention will become clear after a consideration of the following detailed description when read in conjunction with the accompanying drawings, wherein:

Fig. 2 is a view in side elevation showing the mechanism by which the flame burners are mounted for floating movement.

Fig. 3 is an enlarged detail in elevation showing the position of the burner with respect to the ground and with respect to the growing crop plants.

Fig. 4 is an enlarged detail of the burner head which houses the jet from which combustible material is discharged.

Fig. 5 is an end elevation of the structure shown in Fig. 4.

Figure 1:
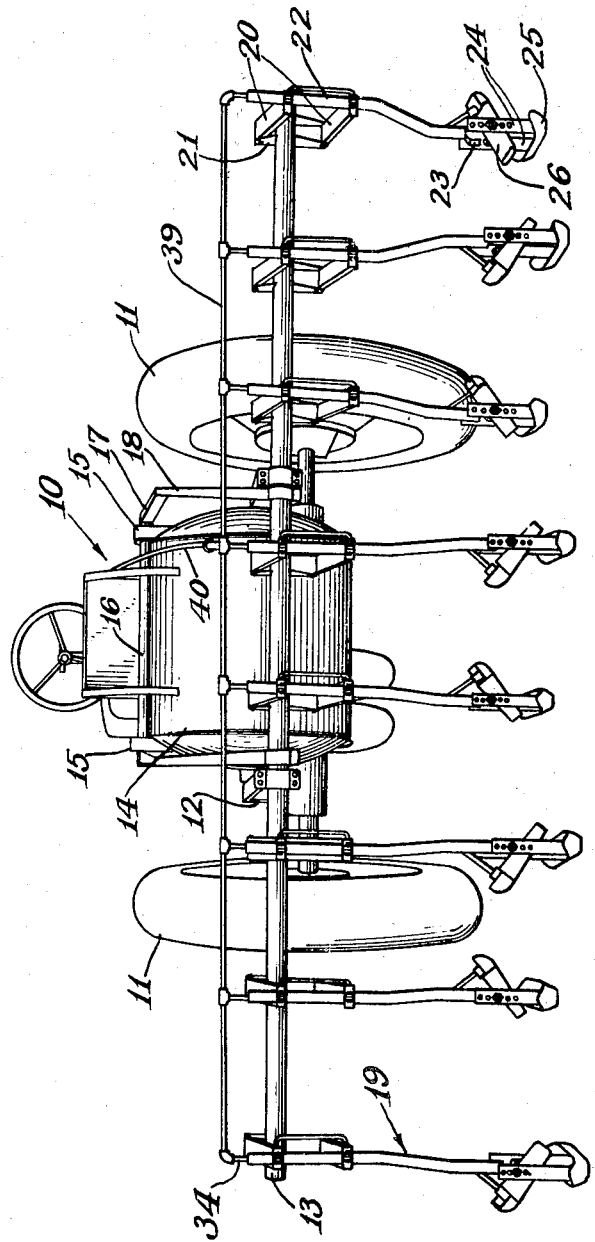
Fig. 1 is an elevation in perspective showing the rear end of a tractor having mounted thereupon flaming apparatus by which the method of cultivation of the present invention is performed.

The method of the present invention is carried out by apparatus which is further described and claimed in co-pending U. S. application Ser. No. 66,907, filed December 23, 1948. This apparatus includes a tractor designated by the numeral 10 having laterally spaced rear drive wheels 11. Mounted upon the tractor is a tank 14 from which fluid is supplied to the burners. Attaching links 12 are provided by which a transversely extending tool bar or pipe 13 is pivotally connected to the fuel tank 14 for substantially vertical movement with respect to the ground. Likewise mounted upon the tank 14 are laterally spaced supports 15 in which is journalled a rock shaft 16 having arms 17 at the ends thereof connected by links 18 with the bar 13 to raise and lower the bar. Rock shaft 16 may be suitably rocked by power lift mechanism of conventional form (not shown) preferably deriving power from the tractor power plant.

Mounted upon the transverse pipe 13 at laterally spaced locations therealong are a plurality of supporting structures 19. These structures are substantial duplicates and a description of one will suffice for all. Supporting structure 19 includes a pair of vertically spaced generally parallel links 20 pivotally connected at their forward ends to a bracket 21 mounted upon the pipe 13. There is secured to the rearwardly extending ends of the parallel links 20 a generally vertically extending standard 22 which is bent as indicated in the drawings for a purpose which will hereinafter become clear.

The lower end of standard 22 has affixed thereto a yoke 23 to the arms of which are secured longitudinally spaced uprights 24. The lower ends of the uprights are secured, as for example by welding, to ground engaging shoes 25.

The ground engaging shoes 25 and the uprights 24 serve as a kind of cradle for the mounting between the uprights of a burner head 26. Burner head 26 is shown in some detail in Figs. 2 to 5 and as will be noted particularly well in Fig. 2 is oblong in shape and is somewhat thicker at its upper portion, indicated at 27, than the lower or outlet portion 28 thereof. The burner head 26 is provided on its upper surface or wall 29 with spaced lugs 30 having circularly arranged serrations 31 provided thereon for cooperation with similar serrations (not shown) provided on the uprights 24. The lugs 30 are secured to the uprights 24 by bolts 32. It should thus be clear that by loosening the bolts 32 the burner head 26 may be adjusted to any desired angle. It may likewise be noted that a plurality of openings 33 are provided in the uprights 24 for the reception of the bolt 32 so that the vertical position of the burner with respect to the ground may be varied. Downward swinging of the links is limited by suitable means such as contact of the upper link with pipe 13 so that all burner units are raised by raising the pipe 13.

It will be noted that the standard 22 is hollow and there is received therein a pipe 34, the lower end of which projects outwardly through a slot in the standard and terminates in a jet 36. The jet 36 is secured to the burner head 26 by means of a bracket 38.

Fuel for discharge from the jet 36 is supplied through the tube 34. Tube 34 extends upwardly through the top of the standard 22 and is connected to a transversely extending flexible pipe 39 which in turn receives fuel for distribution to the various burners through a flexible pipe 40 which is supplied with fuel from the tank 14 mounted upon the rear of the tractor. The fuel is preferably a gas such as butane or propane. The gas is withdrawn from the fuel tank in the liquid phase. The liquid is vaporized by conventional mechanism (not shown) and heat for vaporization may be supplied by the tractor cooling system. In the vapor phase the gas passes from the heat exchanger to an adjustable pressure regulator and through a quick shut-off valve, none of which equipment is shown, to the burners by way of the tubes 39 and 34.

It will be observed particularly well in Figs. 2 and 5 that the burner 26 is provided with an outlet 28 for the flame which is substantially the same width as the body of the burner. In other words, the sides of the burner are in substantial parallelism, while the base or lower wall 42 of the burner slopes upwardly toward the burner outlet to give the burner housing something of a wedge shape.

Gas expelled from jet 36 is ignited and discharged from the burner in the form of a flame as indicated in Fig. 3. The opening in the jet 36 is elongated to correspond generally with the outlet 28 to provide at the outlet a relatively thin broad flame. By providing a wide flat flame the vegetation is exposed to the flame for a longer period than when conventional flames are used. It may also be noted that the size and intensity of the flame can be varied by using jets with larger or smaller openings. When the burner is not in use a pilot flame is preferably kept alive and is prevented from blowing out by means of the windshield 43 shown in Fig. 3. At the top of the burner, shield 43 defines an area through which an abundance of air is supplied for admixture with the fuel 40 to provide for complete combustion thereof. Also in Fig. 3 it will be observed that a line drawn through the axis of the flame and of the burner forms an angle with the ground of approximately 45°. This is the preferred angle of operation because it has been applicants' discovery that, with this angle, by applying the flame to the ground at a location laterally spaced toward the burner head from the plants in the row to be cultivated and at a velocity to cause the flame to impinge upon the ground and flow from one side of the plant row to the other, a back-lap such as is indicated at A in Fig. 3 is formed. This back-lap seals the flame to the surface of the ground, preventing air from entering between the flame and the surface of the ground and causes the flame to adhere closely to the ground as it flows across the plant row. As previously pointed out, in old methods of burning vegetation the flame was directed at the ground at such an angle that air currents under the flame caused it to bounce up and rise into the surrounding foliage of the crop plants, thus seriously damaging or destroying the plant.

Applicants have likewise discovered that while a fixed angle of 45° for the flame with respect to the ground is not essential to the production of good results, the best results are thus obtained. Angles for the flame of more or less than 45° have been proved successful. Applicants have, however, also discovered that the efficiency of operation and the tendency of the flame to hug the ground as it flowed across the plant row seriously deteriorated if angles below 40° or above 50° were selected. The preferred range of operation is therefore between 40° and 50° and an angle of 45° is preferred as producing the optimum sealing of the flame to the ground while wasting as little flame as possible in back-lap.

An important and desirable result of directing the flame at an angle of approximately 45° and one which renders the method of operation of the present invention a great improvement over prior methods, is that the vertical position of the burner with respect to the ground need not be so accurately controlled as with previous methods and apparatus. In other words, while the form of the invention shown and described herein involves the use of a ground contacting skid to maintain a uniform height of the burner relative to the ground so that the flame will not be allowed to rise into the foliage of the crop plant, it should be understood that the burner may occupy a fixed position relative to the tractor and be gauged only from the tractor wheels. In such case, due to the relative positions of the burner and the tractor wheels, the burner may rise and fall relative to the ground as the tractor follows the changes in ground contour. Due to the angle of the flame the burner may rise a much greater distance without contacting the plant foliage than would be the case if the flame were directed at the plant at a much smaller or a much greater angle as has been done with conventional methods and apparatus.

The tendency of a flame to become snuffed out or extinguished upon the outlet becoming clogged or approaching too closely to a solid object to permit free access of the flame to the air is well known. In operating in a cultivated field it often happens that the outlet 28 of the burner 26 approaches too closely a clod of earth or other foreign matter and there is a tendency for the flame to be extinguished. Applicants solved this problem by providing ventilating louvers in the lower wall 42 of the burner head to provide for escape of the products of combustion formed within the burner head upon closure or near closure of the burner outlet, thus preventing the extinguishing of the flame. As will appear hereinafter, certain of these louvers are designed to admit air into the burner head while others are adapted to allow the escape of products of combustion. These ventilating louvers are designated by the numeral 44 and a plurality thereof are provided in the manner shown clearly in Figs. 3 to 5. Applicant has discovered that to discharge these products of combustion from the upper or side walls of the burner head would be to direct flame upwardly and laterally into the foliage of the cultivated plant. As indicated in Fig. 4, for example, openings 45 are provided in the lower wall of the burner head which, due to the conformation of the adjacent wall area lie in planes which are generally perpendicular to the plane of the lower wall 42. The wall area adjacent some of these openings is bulged outwardly in the form of projections or lips 46, semi-circular in shape and defining an opening to the outside for the escape of the products of combustion within the burner head. Certain other of the wall surfaces adjacent the openings are bulged inwardly as at 47 so that air will be drawn into the burner head to remove any tendency to turbulent flow caused by air following the curved path through wind-shield 43. The provision of openings for escape of the products of combustion preserves the flame, although the opening 28 may be entirely closed, and the flame is directed in a downward direction so that the foliage of the cultivated plants is not endangered.

It has already been pointed out that the burner head 26 may be adjusted vertically and its angle with respect to the ground may likewise be adjusted as desired. The burner travels down the field carried by the tractor upon which it is mounted and freely floats by means of the shoe 25, and follows the contour of the ground providing uniformity of flaming of the cultivated crop. Fig. 1 shows a four-row flame cultivator, adjacent pairs of burners straddling a row and the burner heads being directed toward the plants from opposite sides of the row. Fig. 2 shows clearly how standards 22 of adjacent burners are bent in opposite directions to provide longitudinal spacing between burners to avoid interference between oppositely directed flames and to more efficiently flame the vegetation.

Having described the invention in its preferred form it may be understood that modifications may be made therein without departing from the spirit of the invention or the scope of the appended claims.

What is claimed is:

1. In mechanism for the cultivation by flame and the like of stemmed row crop plants wherein a vehicle having a source of fuel supply is propelled over the ground parallel to the crop row, a supporting structure carried by the vehicle, a burner head mounted on the supporting structure in proximity to the ground adjacent the row of crop plants and disposed at an angle with respect to the ground of approximately forty-five degrees, said burner head having an outlet for discharging a flame upon the ground adjacent the crop plants to bathe the stems thereof and the surrounding vegetation with flame, said burner head having substantially unbroken upper and side surfaces, and openings formed in the under surface thereof arranged to release and direct downwardly the products of combustion formed within the burner head upon restriction or closure of the burner outlet, whereby to protect plant foliage above and to the sides of said burner head.

2. In mechanism for the cultivation by flame and the like of stemmed row crop plants wherein a vehicle having a source of fuel supply is propelled over the ground parallel to the crop row, a supporting structure carried by the vehicle, a burner head mounted on the supporting structure in proximity to the ground adjacent the row of crop plants and disposed at an angle with respect to the ground, said burner head having an outlet for discharging a flame upon the ground adjacent the crop plants to bathe the stems thereof and the surrounding vegetation with flame, said burner head having substantially unbroken upper and side surfaces, and openings formed in the under surface thereof in a plane perpendicular to the lower burner wall arranged to release and direct downwardly the products of combustion formed within the burner head upon restriction or closure of the burner outlet, whereby to protect plant foliage above and to the sides of said burner head.

3. In mechanism for the cultivation by flame and the like of stemmed row crop plants wherein a vehicle having a source of fuel supply is propelled over the ground parallel to the crop row, a supporting structure carried by the vehicle, a burner head mounted on the supporting structure in proximity to the ground adjacent the row of crop plants and disposed at an angle with respect to the ground, said burner being generally rectangular in shape providing a broad flat outlet by which a flame is discharged upon the ground adjacent the crop row; said burner having projections formed in the lower wall thereof, each said projection having an opening therein providing communication with the interior of the burner on a line generally parallel to the longitudinal axis thereof to provide outlets for the products of combustion within the burner and prevent snuffing out of the flame due to closure of the burner outlet.

4. In mechanism for the cultivation by flame and the like of stemmed row crop plants wherein a vehicle having a source of fuel supply is propelled over the ground parallel to the crop row, a supporting structure carried by the vehicle, a burner head mounted on the supporting structure in proximity to the ground adjacent the row of crop plants and disposed at an angle with respect to the ground of approximately forty-five degrees, said burner head having an outlet for discharging a flame upon the ground adjacent the crop plants to bathe the stems thereof and the surrounding vegetation with flame, said burner head having substantially unbroken upper and side surfaces and openings formed in the lower surface, the portions of the lower burner wall adjacent certain of said openings protruding outwardly, and the portion of the burner wall adjacent certain other of said openings protruding inwardly to form a lip defining in each instance an opening to the interior of the burner head, the outwardly projecting openings providing for the escape of the products of combustion within the burner head upon closure of said outlet, and the inwardly projecting openings providing for entrance of air to the burner head.

5. In mechanism for the cultivation by flame and the like of stemmed row crop plants wherein a vehicle having a source of fuel supply is propelled over the ground parallel to the crop row, a supporting structure carried by the vehicle, a burner head mounted on the supporting structure in proximity to the ground adjacent the row of crop plants and disposed at an angle with respect to the ground of approximately forty-five degrees, said burner head having an outlet for discharging a flame upon the ground adjacent the crop plants to bathe the stems thereof and the surrounding vegetation with flame, said burner head having substantially unbroken upper and side surfaces and openings formed in the lower surface, the portions of the lower burner wall adjacent said openings protruding from the wall to form a lip defining in each instance an opening to the interior of the burner head, whereby products of combustion within the burner head may escape only from the lower surface thereof upon closure of said outlet, thus avoiding injury to plant foliage above and to the sides of the burner head.

6. In mechanism for the cultivation by flame and the like of stemmed row crop plants wherein a vehicle having a source of fuel supply is propelled over the ground parallel to the crop row, a supporting structure carried by the vehicle, a burner head mounted on the supporting structure in proximity to the ground adjacent the row of crop plants and disposed at an angle with respect to the ground of approximately forty-five degrees, said burner head having an outlet for discharging a flame upon the ground adjacent to the crop plants to bathe the stems thereof and the surrounding vegetation with flame, said burner head having substantially unbroken upper and side surfaces, and a louvered lower wall adapted to permit the products of combustion within the burner head to escape only downwardly upon closure of the burner outlet, whereby injury to foliage above and to the sides of the burner head is avoided.

7. In mechanism for the cultivation by flame and the like of stemmed row crop plants wherein a vehicle having a source of fuel supply is propelled over the ground parallel to the crop row, a supporting structure carried by the vehicle, a burner head mounted on the supporting structure in proximity to the ground adjacent the row of crop plants and disposed at an angle with respect to the ground of approximately forty-five degrees, said burner head having an outlet for discharging a flame upon the ground adjacent the crop plants, to bathe the stems thereof and the surrounding vegetation with flame, said burner head having substantially unbroken upper and side surfaces, and a lower wall having louvers formed therein arranged to discharge the products of combustion from the interior of the burner head in a direction generally parallel to the plane of the said lower wall upon closure of the burner outlet.

8. In mechanism for the cultivation by flame and the like of stemmed row crop plants wherein a vehicle having a source of fuel supply is propelled over the ground parallel to the crop row, a supporting structure carried by the vehicle, a burner head mounted on the supporting structure in proximity to the ground adjacent the row of crop plants and disposed at an angle with respect to the ground of approximately forty-five degrees, said burner head having an outlet for discharging a flame upon the ground adjacent the crop plants to bathe the stems thereof and the surrounding vegetation with flame, said burner head having substantially unbroken upper and side surfaces, and a lower wall having certain louvers formed therein arranged to discharge the products of combustion from the interior of the burner head in a direction generally parallel to the plane of the said lower wall upon closure of the burner outlet, and certain other louvers arranged to direct air from the outside to the interior of the burner head, means for varying the angular position of the burner head with respect to the ground, and a ground engaging support adapted to follow the contour of the ground and to maintain the burner head in a fixed vertical position with respect thereto.

STUART D. POOL.
BERNISE J. SHAGER.

REFERENCES CITED

The following references are of record in the file of this patent:

UNITED STATES PATENTS

| Number | Name | Date |
| --- | --- | --- |
| 1,460,630 | Wiederwax | July 3, 1923 |
| 2,297,301 | Hipple | Sept. 29, 1942 |
| 2,327,204 | McLemore | Aug. 17, 1943 |
| 2,365,465 | Haigler et al. | Dec. 19, 1944 |
| 2,369,154 | McLemore | Feb. 13, 1945 |
| 2,391,027 | McLemore et al. | Dec. 18, 1945 |
| 2,409,792 | Prewitt | Oct. 22, 1946 |
| 2,487,353 | McLemore | Nov. 8, 1949 |
| 2,494,720 | Richards | Jan. 17, 1950 |